Figure 1:
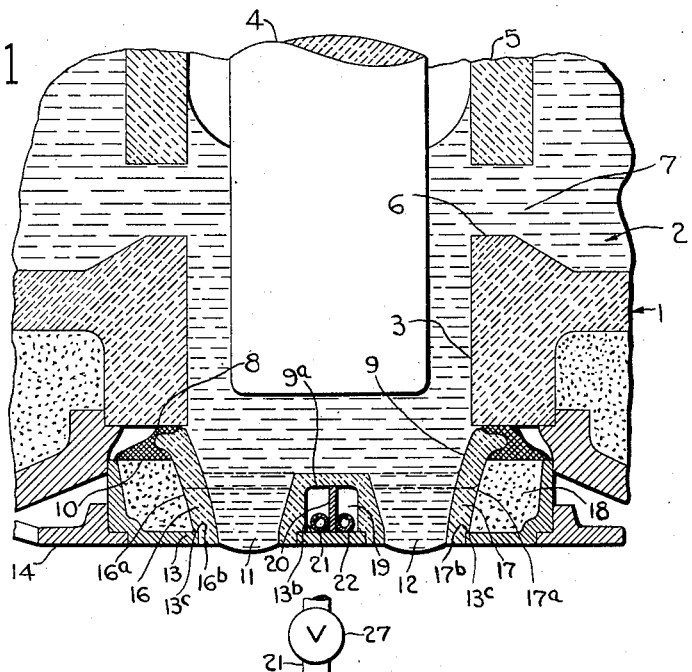

INVENTORS
WALTER K. BERTHOLD
JOHN S. LIGHT
BY Parham + Bates
ATTORNEYS

Patented Oct. 25, 1949

2,485,807

UNITED STATES PATENT OFFICE 2,485,807

MEANS FOR CONTROLLING THE TEMPERATURE OF GLASS IN PLURAL ORIFICES OF GLASS FEEDERS

Walter K. Berthold, Rockville, and John S. Light, Simsbury, Conn., assignors to Hartford-Empire Company, Hartford, Conn., a corporation of Delaware Application November 7, 1946, Serial No. 708,380

8 Claims. (Cl. 49—55)

This invention relates generally to improvements in temperature control means for use in conjunction with forehearth orifice structures from which a plurality of suspended molten glass mold charges may be discharged simultaneously. It relates more particularly to improvements in cooling means for discharge orifices of glass feeders of the type having a well provided with a pair of orifice openings in its bottom evenly disposed about its vertical center line, the well being located in the floor of a feed bowl or boot of a forehearth spout section so as to be continuously submerged by molten glass in the latter and the flow of glass to the well and through its openings being controlled by a vertical implement or implements depending into the glass above the openings in cooperative relationship with the well. Feeders of the above-described type are often known in the art as "double gob feeders."

In part, the success of feeders of the double gob type depends upon the simultaneous production of a pair of suspended molten glass mold charges having uniform weights, shapes and sizes. In commercially attaining uniformity of these factors, it has been found that many aspects of temperature control are of particular importance. It is desirable to have, if possible, at any one horizontal level a symmetrical polar distribution of temperature about the center line of the well. It is also desirable to have polar symmetry of temperatures at any horizontal level in the glass flowing through each discharge orifice opening. It is further desirable to have an equality of temperature conditions between both discharge orifice openings at the same corresponding levels.

It has been found in practice that polar symmetry of the temperature distribution within the well is extremely difficult, if not impossible, to attain. Even if polar symmetry in the well were attained, a temperature gradient across both discharge orifice openings would normally result. The temperature gradient across either or both discharge orifice openings may be further accentuated by an unsymmetrical distribution of temperatures about the center line of the well.

Because of loss of heat by conduction through the retaining walls of the spout, the portions of each discharge orifice opening closest in spaced relationship with the center line of the well tend to have a higher temperature than do the sections of the discharge orifice openings more remote from the center line of the well. This lack of symmetry of temperature conditions within an orifice opening affects the viscosity of the glass flowing therethrough correspondingly and allows the glass closest to the center line of the well to flow more freely than the glass in the more remote sections of the discharge orifice opening. This inequality of flow conditions may result in a lateral deviation of the suspended charges away from the vertical center line of the well, the deviation being known in the art as "warping" or "curling."

The tendency of the suspended charges to warp may be further accentuated by the drag encountered by the molten glass as it moves downwardly along the relatively cool walls of the well to the portions of the orifice discharge openings remote from the center line of the well.

This warping condition is undesirable in the operation of the feeder and may produce temperature inequalities in the glass of the gobs, such warping and temperature inequalities interfering with the formation and delivery of suspended charges best suited to their forming molds and for fabrication into glass articles.

It is an object of this invention to provide individually regulable temperature control means for independently controlling the temperature conditions of the glass flowing through each individual discharge orifice opening of a glass feeder having a plurality of relatively adjacent orifice discharge openings.

It is a further object of this invention to provide cooling means associated with double gob glass feeder discharge orifice structures which will alleviate the tendency towards warping of suspended glass charges accumulating beneath the discharge openings of such orifice structures.

Another object of this invention is the provision of a simple inexpensive temperature influencing system that may be used to influence the rate of discharge of glass through a discharge orifice opening to regulate, in part, the shape and weight of glass charges accumulating in suspension beneath the discharge orifice opening.

Certain of the basic principles and advantages of cooling an orifice structure of the general character here involved have been revealed in U. S. Patent No. 2,340,729 to W. T. Barker, Jr., issued February 1, 1944. The present invention provides improvement over Barker's disclosed cooling means and is intended to provide a complete, easily adjusted independent temperature control for each discharge orifice opening.

Figure 2:
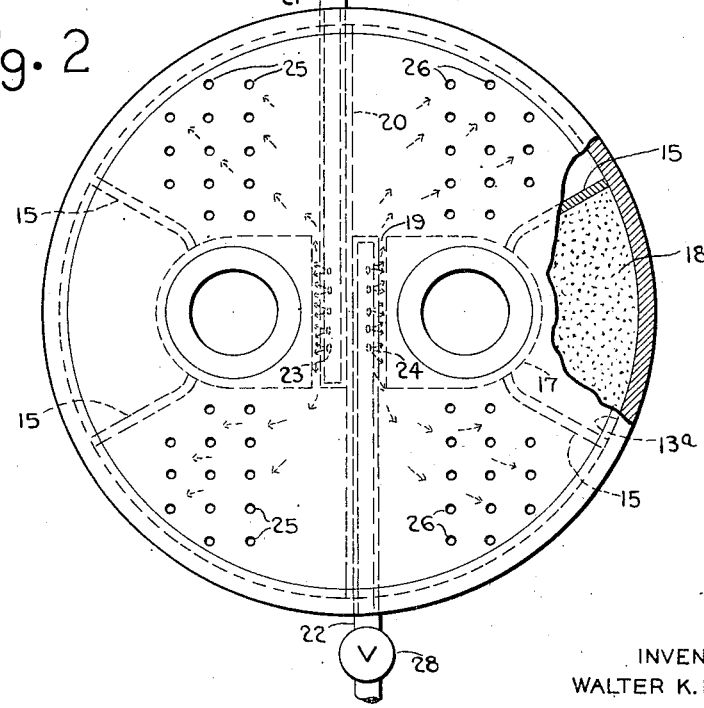

Additional objects and advantages of the present invention will become apparent in the course of the following description of a preferred embodiment which is disclosed with particular reference to the accompanying drawings, in which:

Fig. 1 is a vertical, cross-sectional view of a portion of a double gob glass feeder, showing cooling means of a type embodying the present invention in proper relationship with a pair of discharge orifice openings; and Fig. 2 is a bottom plan view to a somewhat enlarged scale, showing certain details of the cooling means and the orifice structure.

Referring first to Fig. 1, a glass retaining boot or bowl, generally designated 1, may be continually submerged by a pool of molten glass, generally designated 2, which may be supplied by a flow from a glass forehearth (not shown). Boot 1 is formed to define a chamber or well 3 in its lower portion. A laterally adjustable and vertically reciprocable refractory plunger 4 depends during parts of its vertical movement into the molten glass retained in well 3. A laterally and vertically adjustable tube 5 may be rotatably suspended co-axially with plunger 4 above well 3. A horizontal flat face 6 acts as the upper terminus of well 3. Lower end 5a of tube 5 and flat face 6 may be spaced apart vertically and form an annular flow passage 7 through which glass may pass to the well. The molten glass is discharged from the well under the influence of gravity and the reciprocating motion of plunger 4 which at times retards and at other times accelerates the downward flow of molten glass as a result of the plunger's upward and downward vertical movements, respectively. The wall of the well 3 has a lower horizontal face 8. Clamped in juxtaposition therewith is an orifice ring 9, orifice ring 9 being sealed to face 8 by clay luting 10.

Orifice ring 9 is formed to define two orifice discharge openings 11 and 12 in its lower portion. A retainer 13 surrounds and includes a seat 13c for orifice ring 9 and aids in holding ring 9 in juxtaposition with face 8. Shown in Fig. 1 is a portion of a clamping member 14 which may be similar to arm 94 shown in Figs. 1 and 4 of the before-mentioned Barker Patent No. 2,340,729 or may be of any other known suitable form. Clamping member 14 positions retainer 13 and is instrumental in effecting the clamping of the orifice ring to the well structure.

Orifice ring 9 is generally dish shaped, having a flat horizontal lower wall 9a from which depend two independent adjacent tubular projections 16 and 17. These projections have lateral external wall surfaces 16a and 17a, respectively, and their internal openings constitute discharge orifice openings 11 and 12, respectively. Their extreme lower end portions, indicated at 16b and 17b, respectively, Fig. 1, may rest in the aforesaid seats 13c in the bottom of the retainer.

Two pairs of generally radial webs 15 are joined to circumferential wall 13a of retainer 13 and butt against lateral surfaces 16a and 17a of projections 16 and 17, respectively, and also butt against the lateral surface of the orifice ring proper. The sectoral shaped pockets or spaces defined by each pair of webs, retainer 13, and the orifice ring are filled with Sil-O-Cel insulation 18 or other suitable insulating material having substantially similar properties. This insulating material effectively reduces the heat transmission through surfaces 16a and 17a in the region between each pair of adjacent webs 15.

A passage or groove 19 of rectangular cross-section is provided diametrically across the bottom surface of the orifice ring and separates projections 16 and 17 of the orifice ring. A vertical dividing member 20 is centrally disposed longitudinally in passage 19. Member 20 bears along its bottom surface and faces on retainer 13, thus dividing the retainer in half along a vertical plane. The top surface of the dividing member bears on wall 9a of orifice ring 9. As thus divided, each half of retainer 13 encompasses an orifice opening, a pair of webs 15 and the included insulating material 18.

A fluid conveying pipe 21 or nozzle is located adjacent to member 20 and is disposed in that half of retainer 13 that encompasses orifice discharge openings 11. Fluid conveying pipe or nozzle 22 is located adjacent to member 20 in that half of the retainer encompassing orifice discharge opening 12. These fluid conveying pipes are introduced through the lateral side wall 13a of retainer 13. Each pipe extends from the outer wall of the retainer transversely across its bottom wall 13b and terminates in a dead end after passing completely through rectangular passage 19. Each pipe has a plurality of holes or jets upwardly facing and in position to direct a blast of air or other cooling fluid against the vertical side and top surfaces of passage 19. For convenience, the holes in pipe 21 may be designated 23 and the holes in pipe 22 may be designated 24. Sets of exhaust holes 25 and 26 may be provided through the bottom wall 13b of retainer 13 through which cooling fluid, which was introduced into the retainer by pipes 21 and 22, respectively, may exhaust to the atmosphere. Hand valves 27 and 28 may be provided in pipe lines 21 and 22, respectively, to facilitate the control of the rate of flow of the cooling fluid for individual cooling control. These fluid conveying lines may be connected to a source of compressed air. Thus, these pipes convey cooling fluid under pressure to jets or holes 23 and 24 by which the fluid is directed against the wall surfaces of passage 19, the cooling fluid thereafter exhausting to the atmosphere through exhaust holes 25 and 26.

It will be noted that dividing member 20 effectively prohibits a circulation of cooling fluid from one half of the retainer to the other half of the retainer. As a result of this division, it is possible to control the temperature conditions of discharge openings 11 and 12 individually and without complications or interference resulting from an indiscriminate circulation of the cooling fluid through the retainer as a whole.

The flow of cooling fluid over the surfaces of passage 19 will effectively carry away heat from the portions of the orifice ring immediately adjacent to the surfaces of passage 19. This cooling action may be used to advantage to influence the temperature gradient of the glass being discharged through the orifice openings. Thus, if the glass being discharged has a tendency to be hotter in the portions closest to the center line of the well, cooling fluid may be introduced through pipes 21 and 22 to reestablish a more desirable temperature distribution. If only one orifice opening has such a maldistribution of temperature of the glass passing therethrough, the cooling means associated with that orifice opening may be individually operated to re-establish temperature equilibrium by the adjustment of the related valve 27 or 28. If desirable, one hand valve may be completely closed and cooling fluid may be applied to the wall portion of only one discharge orifice opening. If the temperature distribution of the molten glass flowing downwardly through the well is relatively symmetrical with regard to the center line of the well, equal amounts of cooling fluid may be introduced through pipe lines 21 and 22 as required. If this symmetry of temperature conditions within the well should not obtain but a relatively unsymmetrical condition exist, valves 27 and 28 may be opened differing amounts to compensate for the shift in temperature distribution of the glass in the well. This individual control of the temperature conditions of the glass passing through each discharge orifice opening will make it possible to obviate outward warping or curling of either or both suspended molten charges accumulating beneath the discharge openings.

The operation of the herein disclosed temperature influencing means may be used to advantage to retard the flow of molten glass through any one discharge opening by chilling a portion of the glass flowing through that opening. The lowering of viscosity of the glass associated with this chilling action will tend to retard the flow of the glass through the orifice opening and constitutes one factor the control of which may aid in producing the desirable similarity in weight and shape of the suspended charges.

Having thus described our invention, we claim:

1. Temperature regulating apparatus for a double gob glass feeder orifice structure comprising an orifice member having a lower portion formed to define a pair of downwardly directed, adjacent discharge openings therein and a transverse groove in its bottom surface extending between and spacing apart the adjacent side walls of said discharge openings, a dividing member associated with said orifice member so as to divide said transverse groove into separate portions respectively next to the adjacent side walls of said discharge openings, and individually regulable separate means extending into said portions of said groove at opposite sides of said dividing member to convey and direct cooling fluid against localized areas of said orifice member at the adjacent sides of said discharge openings to individually regulate the temperature distribution of glass flowing through each of said discharge openings.

2. Apparatus as defined in claim 1 in which said individually regulable separate means comprise hand valves and fluid conveying pipes extending into said separate portions of said groove and having blanked off ends and having angularly and longitudinally spaced holes to direct said cooling fluid in its egress therefrom.

3. In combination with a glass feeder, an orifice ring having a lower portion formed to define a pair of discharge openings therein and a transverse groove in its bottom surface extending between and spacing apart the adjacent side walls of said discharge openings, a dividing member associated with said ring so as to divide said transverse groove into separate portions respectively next to the adjacent side walls of said discharge openings, individually regulable separate means extending into said portions of said groove at opposite sides of said dividing member to convey and direct cooling fluid against localized areas of said orifice ring at the adjacent sides of said discharge openings, and a retainer member surrounding said orifice ring and in juxtaposition to said dividing member, said retainer having a plurality of holes therein through which cooling fluid may exhaust to the atmosphere.

4. In combination with a glass feeder, an orifice ring having a lower portion formed to define a pair of discharge openings therein and further formed to define a transverse groove in said lower portion between said discharge openings, a dividing member disposed longitudinally in said groove separating said discharge openings, individually regulable separate means disposed in said groove on each side of said dividing member to convey and direct cooling fluid against localized areas of said orifice ring adjacent to said discharge openings, and a retainer member surrounding said orifice ring and in juxtaposition to said dividing member, said retainer having a plurality of holes therein through which cooling fluid may exhaust to the atmosphere.

5. Apparatus as defined in claim 4 and, in addition, partitioning webs extending inwardly from an outer wall portion of said retainer to said orifice ring so as to define sectoral shaped pockets between said orifice ring and the retainer, and insulating material disposed in said pockets to reduce the heat transfer from localized areas of said orifice ring.

6. Apparatus as defined in claim 4 in which said individually regulable means comprise hand valves and fluid conveying pipes having blanked off ends and having angularly and longitudinally spaced holes to direct said cooling fluid in its egress therefrom.

7. Apparatus as defined in claim 3 and, in addition, partitioning webs extending inwardly from an outer wall portion of said retainer to said orifice ring defining therebetween and between adjacent webs sectoral shaped pockets, and insulating material disposed in said pockets to reduce the heat transfer from localized areas of said exhaust ring.

8. An orifice structure comprising an orifice ring having a bottom portion formed to provide a pair of orifice openings having adjacent depending opening-defining walls, a retainer having a bottom portion formed with openings in which the lower ends of the orifice opening walls are seated, said retainer having a continuous side wall encircling said orifice ring in spaced relation therewith, means cooperative with portions of said orifice ring and the side wall of said retainer to define pockets for insulation at the outer sides of the depending orifice opening walls, and separate regulable means at the adjacent sides of said orifice opening walls to apply cooling fluid locally to each of said walls independently of the other, said retainer and said orifice ring cooperating to define separate exhaust chambers for the spent cooling fluid applied to the respective orifice opening walls, said exhaust chambers being in part in heat-exchanging relation with portions of said orifice opening walls.

WALTER K. BERTHOLD.
JOHN S. LIGHT.

REFERENCES CITED

The following references are of record in the file of this patent:

UNITED STATES PATENTS

| Number | Name | Date |
|---|---|---|
| 2,340,729 | Baker, Jr. | Feb. 1, 1944 |